United States Patent [19]

Scarth et al.

[11] Patent Number: 6,064,770

[45] Date of Patent: May 16, 2000

[54] METHOD AND APPARATUS FOR DETECTION OF EVENTS OR NOVELTIES OVER A CHANGE OF STATE

[75] Inventors: Gordon B. Scarth; R. L. Somorjai, both of Winnipeg, Canada

[73] Assignee: National Research Council, Ottawa, Canada

[21] Appl. No.: 08/496,132

[22] Filed: Jun. 27, 1995

[51] Int. Cl.[7] .................................................. G06K 9/62
[52] U.S. Cl. .......................... 382/225; 382/159; 382/274
[58] Field of Search .......................... 382/225, 155–157, 382/159, 288, 128, 254, 274; 364/274.9, 276.6, 972.7; 395/21, 23

[56] References Cited

U.S. PATENT DOCUMENTS

| | | | |
|---|---|---|---|
| 5,315,668 | 5/1994 | O'Hair | 382/225 |
| 5,347,595 | 9/1994 | Bokser | 382/225 |
| 5,359,671 | 10/1994 | Rao | 382/225 |
| 5,425,368 | 6/1995 | Brandt | 382/128 |
| 5,519,789 | 5/1996 | Etoh | 382/225 |
| 5,537,488 | 7/1996 | Mennon et al. | 382/225 |

OTHER PUBLICATIONS

Functional Neuroimaging—8—*Statistical Parametric Mapping*—1994—Karl J. Friston.
IEEE Transactions on Neural Networks, vol. 3, No. 5, Sep. 1992—A Comparison of Neural Network and Fuzzy Clustering Techniques in Segmenting Magnetic Resonance Images of the Brain Lawrence O. Hall et al.
Magnetic Resonance Imaging, vol. 12, No. 7, pp. 975–982, 1994 Functional Magnetic Resonance Imaging at 1.5 T: Activation Pattern in Schizophrenic Patients Receiving Neuroleptic Madication—Frederik Wenz et al.
Human Brain Mappin 1:293–304 (1994)—Activation of the Prefrontal Cortex in a Nonspatial Working Memory Task With Functional MRI—Jonathon D. Cohen et al.
IFIS 1993, 0–7803–1485–9/93—*Simulation Studies of Fuzzy Clustering in the Context of Brain Magnetic Resonance Imaging*—Michael E. Brandt et al.
Journal of Cerebral Blood Flow and Metabolism—14:952–957, 1994—Correlational Imaging of Thalamocortial Coupling in the Primary Visual Pathway of the Human Brain—Andreas Kleinschmidt et al.
Proteins: Structure, Function, and Genetics 14:249–264(1992)—Fuzzy Cluster Analysis of Molecular Dynamics Trajectories—Heather L. Gordon et al.
Human Brain Mapping 1:173–184 (1994)—Human Brain Atlas: For High–Resolution Functional and Anatomical Mapping—P. E. Roland et al.

*Primary Examiner*—Matthew Bella
*Attorney, Agent, or Firm*—Murray E. Thrift; Adrian D. Battison; Michael R. Williams

[57] ABSTRACT

A significant problem is unsupervised detection of events in the digital image representation of objects or bodies acquired at logically different states. To detect events a set of sample data points is selected, and normalized using a novel technique to desensitize the analysis to the intensity level of the data. The normalized data are presented to a clustering algorithm, preferably the fuzzy C-Means clustering algorithm which groups the data into a user-specified number of clusters. The resulting clusters are not affected by human bias or preconceived notions, since the process is independent of prior knowledge of the events. The cluster centroids identify the characteristics of the events and the cluster maps depict the image domains associated with the events. The invention is equally applicable to normal and abnormal events and is capable of detecting expected and unexpected results.

29 Claims, 3 Drawing Sheets

METHOD AND APPARATUS FOR DETECTION OF EVENTS OR NOVELTIES OVER A CHANGE OF STATE

FIELD OF THE INVENTION

The present invention relates to event or novelty detection in data sets.

BACKGROUND

The invention has particular, although not exclusive, application to event or novelty detection in time dependent two or three dimensional imaging data. Particular reference will be made to this application of the invention in the following, but it is to be understood that the invention has broader application.

Imaging data may be recorded representing physical properties of an object at regularly spaced locations in a one-dimensional, two-dimensional or three-dimensional spatial array. The data may be acquired at logically different states. Examples of data acquired at logically different states include: data representing a common object recorded at different times; data representing a common object recorded using different imaging techniques; and data representing plural similar objects.

The data can be acquired by a variety of methods. Examples of such methods include nuclear magnetic resonance (NMR), computer axial tomography (CAT), positron emission tomography (PET), emission computed tomography (ECT), multimodality imaging (MMI), and x-ray scanning methods. Each of these methods produces a two-dimensional array of data values, representing a two-dimensional grid within the object, designated as a slice. By repeating the acquisition procedure over all slices of interest, a three-dimensional array of data values results. Two-dimensional data arrays can be acquired as a single slice using any of the aforementioned methods, or with a digitizing camera. Regardless of the method of acquisition, the data represent physical properties of the object. This invention is not dependent on the method of data acquisition.

It is known to analyze such arrays with the addition of explicit prior knowledge of events that are of interest to identify regions and domains associated with those events. A "region" is a connected set of spatial data points including all points on the boundary of the set. A "domain" is a number of disjoint regions. The known methods only seek to identify the regions and domains of the data associated with given and known events. For example, data representing the human brain performing a task over time can indicate the portions of the brain where events occur that are known or expected to be associated with the performance of the task.

Known methods for the detection of events include image differencing, correlation analysis, and statistical t-maps.

The image differencing method subtracts an aggregate of data representing one logical state from an aggregate of data representing another logical state. Domains where the magnitude of the difference is large may signify a qualitative difference in the data between the two logical states.

The statistical t-map approach is similar to the image differencing method, with the addition that the difference is scaled by the pooled standard deviation to derive a t-value. A statistical probability of the two logical states being different is calculated from the t-value. Domains where the resulting statistical probability value is large may signify a difference in the data between the two logical states.

The drawbacks of subtractive procedures of this sort include:

Some information regarding the two states is required a priori, for example times associated with the different states. This biases the measure towards the user's expectations of which time instances are associated with the two states in question. This information may not be evident.

The subtraction procedure is not readily applicable to data with more than two states, for example certain types of temporal data.

The subtraction procedure does not indicate the nature of the novelty.

Subtraction procedures are sensitive to artifacts in the data.

The correlation method correlates a waveform representing an assumed pattern with the data. Domains where the correlation is large may signify a correspondence to the pattern. The disadvantages of this type of analysis include:

The nature of the event to be found must be known a priori. Thus, the analysis is based on the operator's expectations.

It is not possible to identify unknown or unexpected events in the data.

Correlation analysis is sensitive to time or other analogous shifts in the behavior of the data. Thus, similar characteristics that are shifted out of phase (i.e. displaced) across the data arrays will have a low correlation.

An independent analysis must be performed for each expected response.

The most important limitation of the prior art methods is that they can not detect new and unexpected events (novelties). As an example, consider a task that involves some activity of the human brain, such as moving the fingers of the dominant hand. The task could begin by keeping the hand motionless for an initial time, followed by moving the fingers at a successively greater pace until the end of the task, signified with no finger movement. A set of images of the brain can be recorded during each phase of the task. We wish to determine the domains of the brain that were activated during the finger movements, and how these domains were activated over time. Thus the successful detection of events for this example would identify the domains of the brain activated for the differing degrees of finger movement and the corresponding brain activation pattern in each domain. Successfully detected events could include a pattern which follows the activity of finger movement, and another pattern representing no change in brain activity (a null event).

The prior art methods require explicit knowledge of the events associated with each phase of the finger movement task. The image differencing method requires temporal data in order to subtract the average of data acquired with the hand at rest from the average of data acquired with hand movement. The correlation method requires a knowledge of the waveform representation of the activity associated with finger movement in order perform a correlation analysis with that waveform. The statistical t-map method, like the image differencing method, requires prior knowledge of the event to identify data associated with the hand at rest and with finger movement.

With the known methods the domains where the results are large in magnitude may signify finger movement. However, if the time of each phase of the task is unavailable, then none of the known methods can detect the events. As an example, if the finger movement task is replaced with a cognitive task such as calculating the square root of several prime numbers, then the times associated with the states of the task may be unknown. Also, if the response of a brain region is delayed, the known methods are incapable of detecting the delayed response. The known methods may still assign a relatively large magnitude to the delayed response in comparison to other responses, introducing imprecise and unreliable results. All known methods are also incapable of detecting graduated degrees of brain activity resulting from the increasing pace of finger movement since the actual brain response is unknown. In this case, pairwise analysis is inappropriate since no definite start and stop times can be identified for the graduated task.

The present invention is concerned with a technique for detecting events and novelties in data that does not require prior knowledge or a preconceived notion of the novelty or event and thus can identify entirely unexpected characteristics.

With imaging data, the invention is concerned with the detection of spatial domains associated with events, as well as non-spatial-dimension characteristics of the events. The non-spatial-dimension characteristics may be characteristics in the non-spatial dimension in which the data representation of the object may have logically different states.

Images often contain a large range of intensity values differentiating between physical attributes of an object. Since events can occur at any value of intensity, it would in most cases be desirable to detect similar events independently of the intensity value at the location of the events.

SUMMARY

According to one aspect of the present invention there is provided a method for detecting events in data, said method comprising:

providing a data set including plural data arrays, with each array having plural data points and with corresponding data points in the data arrays having data values that may vary across the arrays; and clustering the data points into plural clusters according to data value patterns across the arrays.

Clustering of the data is preferably preceded by normalization of the data. Normalization removes intensity dependence. Prior art methods do not normalize the data prior to analysis. Various normalization methods may be applied; these methods may include robust normalization, percent change, baseline subtraction and no normalization. In most cases robust normalization is preferred.

The clustering procedure is preferably carried out using the fuzzy C-means clustering algorithm as described in Bezdek, J. C. "Pattern Recognition with Fuzzy Objective Function Algorithms " New York: Plenum Press, 1981, which is incorporated herein by reference. The algorithm clusters data value patterns of greatest similarity into groups, with the between group dissimilarity of the characteristics maximized while the within group dissimilarity is minimized. While fuzzy C-means clustering has been used in image processing, the clustering has been done in the spatial domain to enhance an image, rather than across data arrays to locate and analyze novelties and events that appear across the data arrays.

Examining the cluster centroids allows determination of novelties or events of interest, while examination of the membership of each cluster identifies those regions of the data that are of interest. Where the data are imaging data, an image can be generated showing the spatial distribution of the data points of a selected cluster.

One particularly advantageous application of the method is the analysis of data arrays collected at different times, so that the data value behavior across time is clustered to locate and identify the characteristics of temporal novelties in the data.

Preliminary steps that may be useful include a statistical analysis to locate regions of interest for more detailed investigation. For example, determining the standard deviation of the data values across the arrays will identify regions of data points of greatest activity. The regions of interest may also be identified with robust parametric and non-parametric statistical analysis. The image data can be filtered prior to the analysis in order to remove undesirable signal components such as noise. The image data may be registered to align the images prior to analysis, using some known registration routine.

Statistical analysis can be applied to the data in order to associate statistical relevance with the cluster maps. Post-processing, including connectivity algorithms can be applied to enhance the information content of the cluster maps, as is known in the prior art.

To further discriminate between the events, the method can be reapplied to a new subset of the data selected from the one or more interesting clusters found in an earlier application of the method.

According to another aspect of the present invention there is provided apparatus for detecting events in a data set comprising plural data arrays, with each array comprising plural data points and with corresponding data points in the data arrays having data values that may vary across the arrays, said apparatus comprising:

data storage means for recording the data set; and clustering calculator means for clustering the corresponding data points into clusters according to the data value patterns across the arrays.

In preferred embodiments, the apparatus includes a normalization calculator for normalizing the data before it is clustered.

The apparatus may, in practice, be an appropriately programmed general purpose computer.

A display may be associated with the computer to display the data, cluster centroids and cluster maps showing the distribution of data points in the individual clusters.

The apparatus may also include a data gathering device. This may be, for example, a nuclear magnetic resonance (NMR), computer axial tomography (CAT), positron emission tomography (PET), emission computed tomography (ECT), multimodality imaging (MMI), or x-ray scanning system. Video cameras and other devices that produce appropriate data arrays may also be used as appropriate to the application.

Apart from its use in analyzing temporal data, the present invention may be used to detect events appearing in a sequence of similar data arrays of any sort. It may be used, for example to find anomalous objects on a manufacturing production line.

BRIEF DESCRIPTION OF THE DRAWINGS

In the accompanying drawings, which illustrate an exemplary embodiment of the present invention.

DETAILED DESCRIPTION

Figure 1:
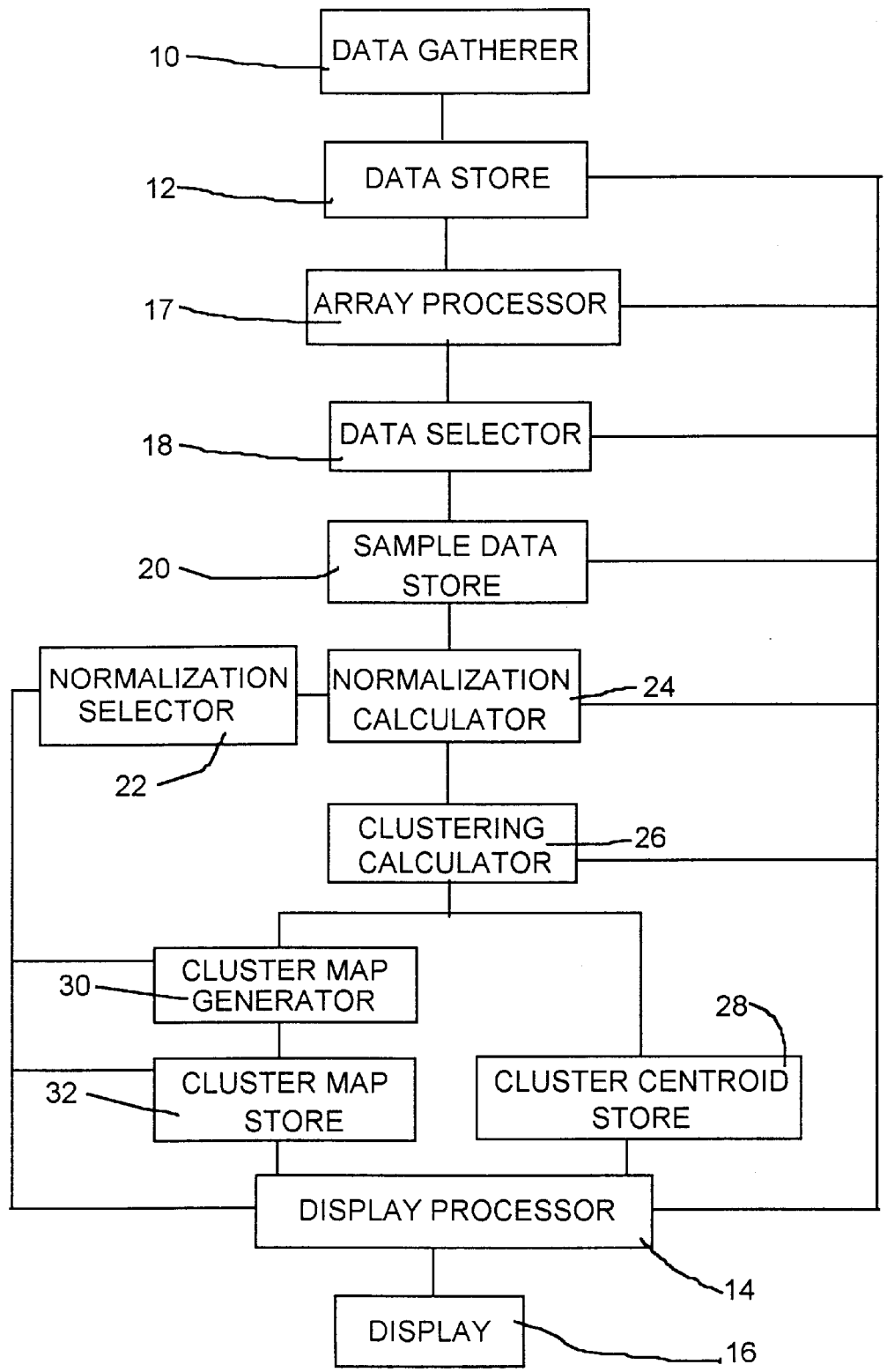
FIG. 1 is a schematic illustration of an apparatus according to the present invention.
Figure 2:
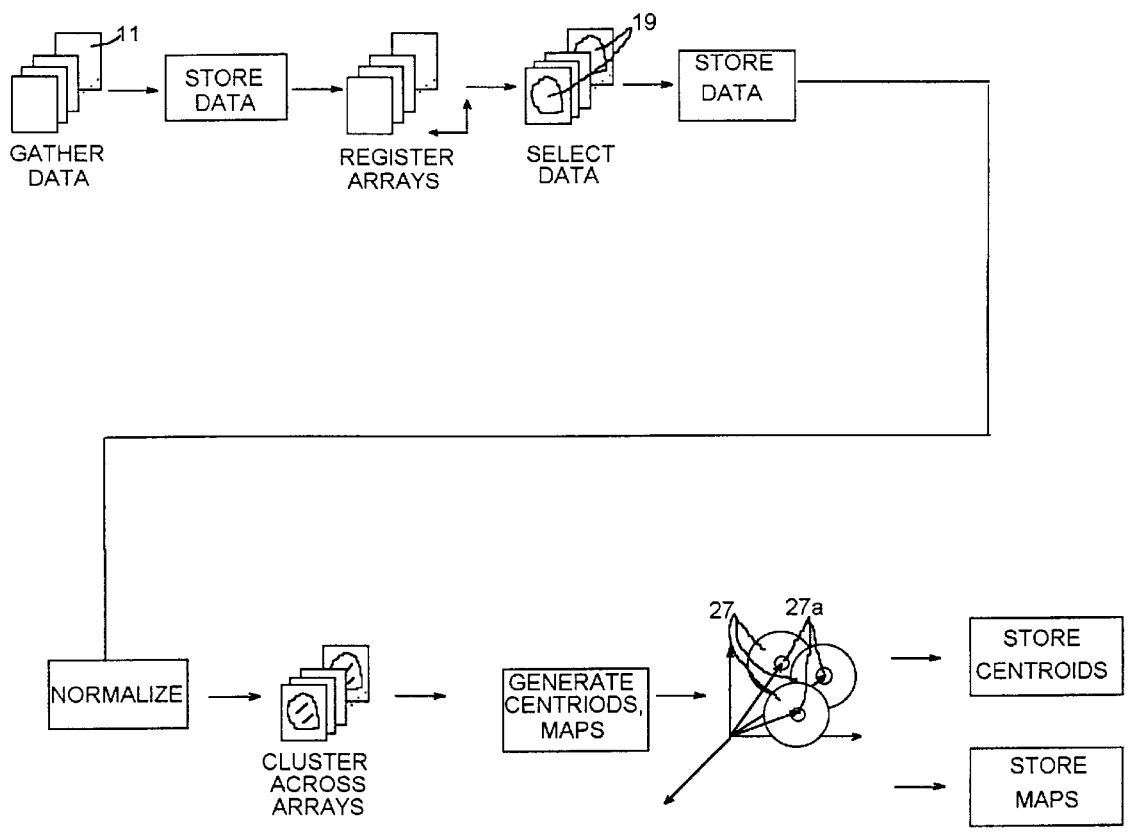
FIG. 2 is a schematic illustration of a process according to the present invention for novelty detection in temporal imaging data.

Referring to the accompanying drawings, the FIG. 1 flowchart depicts schematically an event detection system for use with time dependent imaging data. A data gatherer 10 gathers the data to be processed. The data represents physical properties of an object at regularly spaced locations in multi-dimensional spatial arrays 11 (FIG. 2). The data for the individual arrays are acquired at different times. The data is recorded in a data store 12 that is a computer-readable memory. This data may be processed by a display processor 14 for display on a display apparatus 16. This provides an image display in any desirable dimension of the data, including the temporal dimension and the spatial dimensions. An array processor 17 registers the image data of the arrays prior to analysis. A data selector 18 is used to select a subset 19 (FIG. 2) of the image data. Domains of non-interest can be excluded from analysis by not including these domains in the subset. An example of an uninteresting region is background where object data are absent. If a subset is not available, the entire image data are used by default.

The selected data are stored in the sample data store 20, which is computer-readable memory used as a work area for normalization. A normalization technique is selected using the normalization selector 22. By default, robust normalization is used, as described below. The normalization technique selected and the selected image data in the sample data store 20 are passed to the normalization calculator 24 where the image normalization is performed.

The normalized data are passed to the clustering calculator 26 where the data are presented to the fuzzy C-means clustering algorithm. The clustering algorithm produces a user selected number of clusters 27. The results from applying the clustering algorithm include a cluster centroid 27a for each cluster. The cluster centroids are recorded in computer-readable memory, in a cluster centroid store 28. The clustering algorithm also has an output to a cluster map generator 30. This produces cluster maps that are recorded in computer-readable memory, in cluster map store 32. The cluster centroid data and the cluster map data may be processed by the display processor 14 for display on the display apparatus 16. The membership maps of the different clusters are displayed in different colours.

Normalization of the Data:

The image data is normalized across the data arrays prior to analysis in order to eliminate intensity level dependence. This is a normalization along the non-spatial dimension. An independent normalization is performed at each spatial location of the multi-dimensional image data set. One of four methods of normalization is selected: robust normalization, percent change, baseline subtraction and no normalization.

In selecting the normalization method, the robust normalization approach is the default method that performs well under most circumstances. The robust normalization method identifies patterns in the data. This is particularly useful if only patterns of events across the data arrays, e.g. in the non-spatial dimension, are of interest. The percent change normalization method is used if the event is differentiable from non-events by a change in intensity proportional to the absolute intensity. The baseline subtraction method is used when events cause equal deviations in intensity at all intensity levels. No normalization is used if the intensity values are approximately equal for the entire image data set. This is functionally equivalent to the baseline subtraction method with zero baseline.

The robust normalization method requires the subtraction of an estimate of the baseline followed by the subsequent division by the standard deviation of the characteristic. For this case, the estimate of the baseline is usually chosen to be the mean value of the characteristic. Note that the median value can be substituted for the mean value, and the mean absolute deviation (MAD) value can be substituted for the standard deviation for the robust normalization if this is desirable and appropriate. The MAD value is calculated as the median of the absolute value of the subtraction of the median value from the data. The median and MAD values are less sensitive to outliners than the mean and standard deviation.

The percent change normalization requires the calculation of the percent change from an estimated baseline of the data. A baseline can be calculated from the first data point, from the mean of a few data points, or from the mean of the entire non-spatial dimension. The percent change normalization is calculated by subtracting the estimate of the baseline followed by division by the estimate of the baseline for each point of the non-spatial dimension.

The baseline subtraction normalization method is the same as the percent change normalization, with the exception that division by the estimate of the baseline is excluded.

No normalization does not affect the data.

Figure 3:
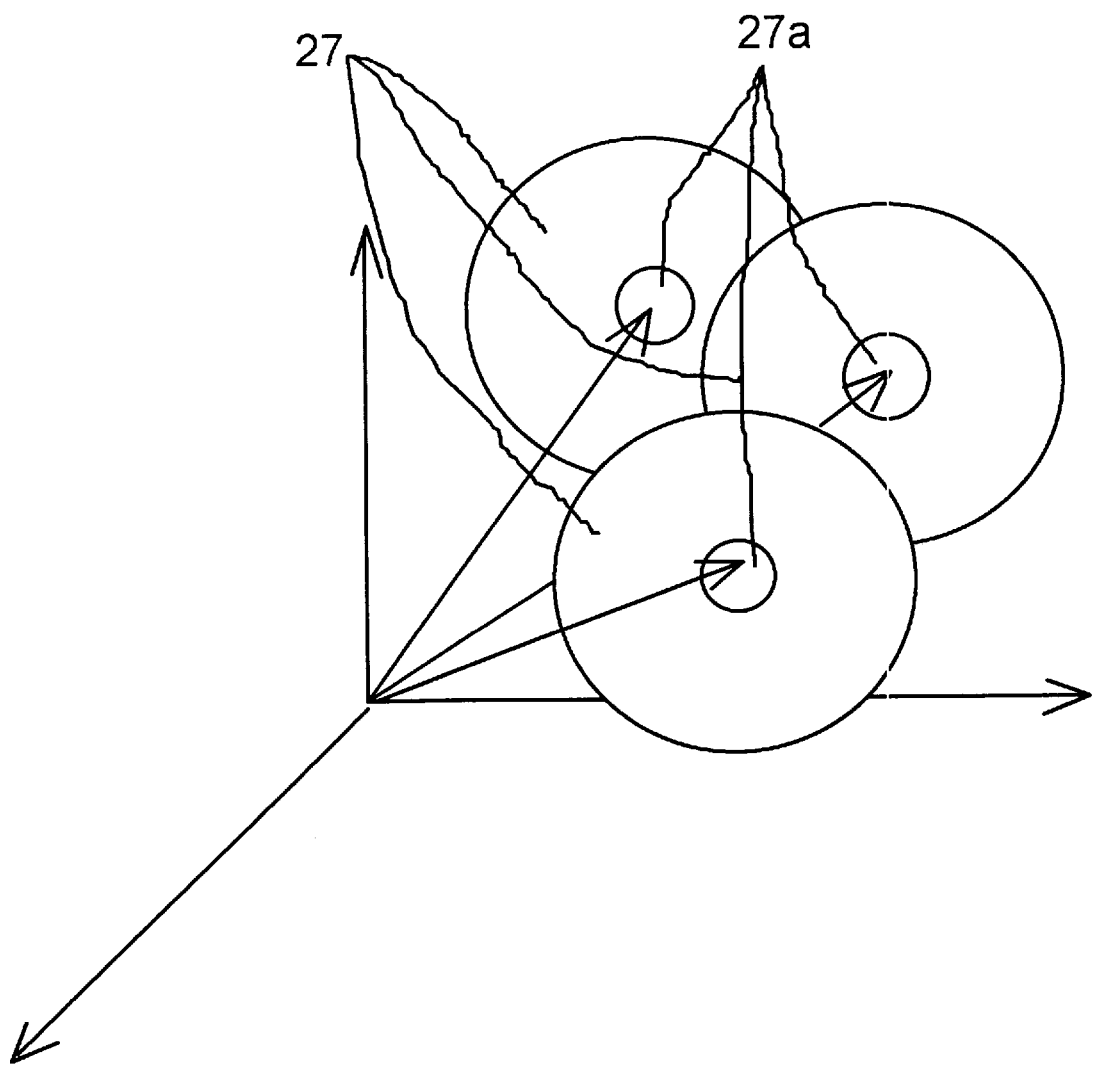
FIG. 3 displays a typical clustering result in three dimensions.

Clustering of the Normalized Data:

Distinct events are detected by applying the clustering algorithm to the normalized image data. The clustering algorithm groups the data into a number L of clusters specified by the user. FIG. 3 displays a typical clustering result in three dimensions including the space of the clusters 27 and the cluster centroids 27a using three clusters. With fuzzy clustering, the degree of "fuzziness" of the clusters is controlled by a parameter m>1 (m=1.2 works well), and typically, ten to thirty iterations are required to converge to a solution. The algorithm is initialized with L centroids, sampled uniformly from the hyperparallelpiped enclosing the data. A large number L of clusters can be selected to give maximal discrimination. If two or more centroids appear similar, the number of clusters can be reduced and the clustering analysis repeated on the normalized data.

The result of the clustering algorithm includes a cluster centroid and a membership map for each cluster. A cluster centroid is a weighted average of the selected data over the non-spatial dimension, where the weight is large for data similar to the centroid. This gives a representation of the non-spatial dimension characteristics of the cluster. A cluster membership map gives the degree of belonging of each data point to the cluster. If a data point contains a high membership to a cluster, then it necessarily contains low membership to all other clusters.

The cluster centroids can be viewed with the display apparatus 16, which displays the characteristics of the events. Uninteresting clusters may be discarded, while interesting clusters are retained. Cluster maps are formed by thresholding the memberships of the interesting clusters at a user-specified level of confidence using the cluster map generator 30. The cluster maps can also be displayed with the display apparatus 16. This is analogous, but not restricted to, the process of selecting a confidence interval for a statistical analysis. The cluster map depicts domains of the image data associated with the events revealed by the corresponding cluster centroid.

Note that the present invention detects normal and abnormal events without prior knowledge of the characteristics of the events. Thus no human bias or preconceived notions are introduced into the analysis. The events detected are the actual events rather than the expected events. Since normalization is applied to the data, similar patterns of events at differing levels of intensity in the image data can be associated and detected. Also, there is no restriction on the number of logical states that can be detected. There is also no restriction on the size of the image data set, or the total number of logically different states that can be used. New and unexpected events both in the spatial and non-spatial dimensions can be identified.

While one embodiment of the present invention has been described in the foregoing, it is to be understood that other embodiments are possible within the scope of the invention. The invention is to be considered limited solely by the scope of the appended claims.

What is claimed is:

1. A method for detecting events or novelties in data representing one or more objects, said method comprising:

provinding a data set including plural images comprising respective data arrays representing the one or more objects at logically different states, with each array having plural data points and with corresponding data points in the data arrays having data values that may vary across the arrays;

minimizing intensity variations between the data arrays by normalizing the data using a normalization method selected from the group consisting of percent change normalization, baseline subtraction normalization and robust normalization;

determining data value patterns for sets of corresponding data points across the arrays; and clustering the data value patterns into plural clusters according to data value patterns across the arrays.

2. A method according to claim 1 comprising clustering the data value patterns using a fuzzy C-means clustering algorithm.

3. A method according to claim 2 including the step of calculating a centroid of each cluster.

4. A method according to claim 2 including the step of calculating a membership map of each cluster.

5. A method according to claim 4 including the step of displaying the membership map of selected ones of the clusters.

6. A method according to claim 1 including the preliminary step of collecting the data of the respective data arrays at different times whereby the data points of each cluster have similar data value behaviors across time.

7. A method according to claim 1 wherein each data array represents an image of an object.

8. A method according to claim 7 including the step of displaying an image of the data points associated with selected ones of the clusters.

9. A method according to claim 8 comprising displaying the data points associated with the selected ones of the clusters in different colours.

10. A method according to claim 3 including the step of displaying the centroids of selected ones of the clusters.

11. A method according to claim 1 including, before clustering the data points, filtering the data to remove selected signal components.

12. A method according to claim 1 including, before clustering the data points, registering the data arrays.

13. A method according to claim 1 comprising registering the arrays before normalization.

14. Apparatus for detecting events or novelties comprising sequential changes in the logical state of one or more objects, said apparatus comprising:

data collection means for collecting a data set, including means for collecting plural images comprising respective data arrays representing logically different states of said one or more objects, with each array comprising plural data points and with corresponding data points in the data arrays having data values that may vary across the arrays;

data storage means for recording the data set;

normalizing calculator means for minimizing intensity variations between the data arrays by normalizing the data before it is clustered by the clustering calculator means, the normalizing calculator means comprising:

robust normalization means for robust normalization of the data, percent change normalization means for percent change normalization of the data, baseline subtraction normalization means for baseline subtraction normalization of the data, and selector means for selecting one of said normalization means for normalizing the data;

means for determining data value patterns for sets of corresponding data points across the arrays; and clustering calculator means for clustering the corresponding data value patterns into clusters according to data value patterns across the arrays.

15. Apparatus according to claim 14 including means for identifying uninteresting domains in the data set and means for eliminating the data points of the uninteresting domains from the data points to be clustered.

16. Apparatus according to claim 15 wherein the means for identifying uninteresting domains in the data set comprise means for statistically analyzing the data.

17. Apparatus according to claim 14 including means for filtering the data to remove selected signal components before clustering the data points.

18. Apparatus according to claim 14 including, means for registering the data arrays.

19. Apparatus according to claim 14 wherein the clustering calculator means comprise means for clustering the data with a fuzzy C-means clustering algorithm.

20. Apparatus according to claim 14 wherein the means for collecting plural data arrays comprise means for collecting the respective data arrays at different times whereby the data points of each cluster have similar data value behaviors across time.

21. Apparatus according to claim 20 wherein the means for collecting the plural data arrays comprise means for collecting data representing images of an object.

22. Apparatus according to claim 21 comprising means for registering the data arrays to align the images before normalization.

23. Apparatus according to claim 14 wherein the clustering calculator means include means for calculating the centroids of selected ones of the clusters.

24. Apparatus according to claim 23 including means for displaying the centroid of each selected cluster.

25. Apparatus according to claim 23 wherein the clustering calculator means include means for calculating a membership map of each cluster.

26. Apparatus according to claim 25 including means for displaying the membership maps of selected ones of the clusters.

27. Apparatus according to claim 26 comprising means for displaying the membership maps of the selected ones of the clusters in different colours.

28. Apparatus according to claim 23 including means for selecting clusters and data store means for storing the data values of data points associated with the selected clusters.

29. Apparatus according to claim 28 wherein the data store means comprise means for storing the centroids of the selected clusters.

* * * * *